United States Patent [19]
Hashimoto

[11] Patent Number: 5,173,769
[45] Date of Patent: Dec. 22, 1992

[54] VIDEO SIGNAL PROCESSING APPARATUS

[75] Inventor: Yasuhiro Hashimoto, Tokyo, Japan

[73] Assignee: Sony Corporation, Tokyo, Japan

[21] Appl. No.: 680,410

[22] Filed: Apr. 4, 1991

[30] Foreign Application Priority Data

Apr. 9, 1990 [JP] Japan ................... 2-93710

[51] Int. Cl.$^5$ .............................................. H04N 1/46
[52] U.S. Cl. ....................................... 358/80; 358/75
[58] Field of Search ................... 358/37, 166, 36, 167,
358/75, 80, 467, 458, 455, 463, 454

[56] References Cited

U.S. PATENT DOCUMENTS

| | | | |
|---|---|---|---|
| 3,778,543 | 12/1975 | Lowry | 358/37 |
| 4,663,662 | 5/1987 | Sekizawa et al. | 358/75 |
| 4,677,465 | 6/1987 | Alkofer | 358/80 |
| 5,119,187 | 6/1992 | Ikeda et al. | 358/75 |

Primary Examiner—James J. Groody
Assistant Examiner—David E. Harvey
Attorney, Agent, or Firm—Lewis H. Eslinger; Jay H. Maioli

[57] ABSTRACT

A color video signal processing apparatus includes an edge detecting circuit for detecting an edge portion of an image contained in color difference signals; a region dividing circuit for dividing the image, except the detected edge portion, into regions determined in accordance with the levels of the luminance signal; and an intra-region averaging circuit for averaging the color difference signals in the individual divided regions. The color difference signals in the edge portion are output directly, while the color difference signals in the divided regions are outputted after being averaged. Except in the edge portion where variations of the color difference signals are conspicuous, the image is divided into one or more regions determined in accordance with the luminance signal levels, and the color difference signals in the individual regions are averaged. Since the color difference signals are averaged in the portion where color variations are minimal, any video signal noise that causes color nonuniformity and so forth can be eliminated in such portion having little color variations.

7 Claims, 9 Drawing Sheets

3 × 3 dots

3 × 5 dots

FIG. 5A

| -1 | 0 | 1 |
|---|---|---|
| -2 | 0 | 2 |
| -1 | 0 | 1 |

X-direction

FIG. 5B

| -1 | -2 | -1 |
|---|---|---|
| 0 | 0 | 0 |
| 1 | 2 | 1 |

Y-direction

FIG. 7A

| -1 | -1 | 0 | 1 | 1 |
|---|---|---|---|---|
| -1 | -2 | 0 | 2 | 1 |
| -1 | -1 | 0 | 1 | 1 |

FIG. 7B

| -1 | -1 | -1 |
|---|---|---|
| -1 | -2 | -1 |
| 0 | 0 | 0 |
| 1 | 2 | 1 |
| 1 | 1 | 1 |

VIDEO SIGNAL PROCESSING APPARATUS

BACKGROUND OF THE INVENTION

1. Field of the Invention

The present invention relates to a video signal processing apparatus which is adapted for processing an input video signal in a desired mode and producing a printable output video signal.

2. Description of the Prior Art

Technical development relative to a still print image processing system is currently in progress, wherein a video signal of one frame representing a still image and obtained from a video source such as a television camera, video disk, still camera or the like is input to an image processor, which then processes the input video signal in various stages to generate a desired print image signal, and such processed image signal is supplied to a printing means so as to be printed.

Since such a still image is continuously displayed for a long time, some image quality deterioration inclusive of luminance and chrominance nonuniformity is prone to be conspicuous as compared with a moving image, and therefore it is necessary to eliminate the video signal noise which causes such image quality deterioration. In the conventional techniques contrived for elimination of the image noise, there are known an intra-window averaging and a smoothing with a low-pass filter or the like in a spatial frequency region. As the techniques for eliminating the video signal noise without impairing any important information of the image relative to its edges and so forth, there are further known a selective local averaging and a special process for removal of minute-amplitude components.

The selective local averaging is a technique of first detecting edges or segments and then averaging merely the dots where the detected edges or segments are not existent. Exemplary general-purpose methods proposed heretofore include a smoothing with retention of edges (e.g., CGIP, Vol. 9, No. 4, pp. 394-407, April 1979) repeated for elimination of noise, and a smoothing with local pixel selection. In addition thereto, a variety of algorithms are proposed with regard to exclusive operators for special subjects to be processed.

Special processing for elimination of minute-amplitude components is a technique of absorbing small signal fluctuations while retaining great-amplitude information relative to edges and segments. For example, there are known hysteresis smoothing which absorbs noise by hysteresis characteristics (e.g., CGIP, Vol. 8, No. 8, pp. 121-126, August 1978); a median filter capable of outputting a median or intermediate value in a window; and an E filter which performs low-pass filtering in a coordinate system dependent on the input signal amplitude and thereby eliminates only the low-amplitude components.

However, one of such conventional noise elimination techniques removes the minute signal fluctuations in local regions, but is incapable of removing the video signal noise which causes color nonuniformity and so forth in a relatively wide area such as a planar portion of a building or a background in a still picture where color variations are minimal.

OBJECT AND SUMMARY OF THE INVENTION

The present invention has been accomplished in view of the circumstances mentioned, and its object resides in providing an improved video signal processing apparatus which is capable of eliminating video signal noise which causes conspicuous color nonuniformity or the like in any image portion where color variations are minimal.

In the video signal processing apparatus of the present invention adapted for processing an input video signal in a desired mode and producing a printable output video signal, there are included an edge detecting means for detecting an edge portion of an image of a color difference signal; a region dividing means for dividing the image into regions determined in accordance with the levels of a luminance signal except the detected edge portion; and an intra-region averaging means for averaging the color difference signals in the individual divided regions. Due to such constitution, the color difference signal in the edge portion is output directly therefrom, while the averaged color difference signal is output from each of the divided regions, thereby eliminating the video signal noise that causes conspicuous color nonuniformity or the like in any image portion where color variations are little.

The above and other features and advantages of the present invention will become apparent from the following description which will be given with reference to the illustrative accompanying drawings.

BRIEF DESCRIPTION OF THE DRAWINGS

FIGS. 5a, 5b, 6a, 6b, 7a and 7b are schematic diagrams for explaining edge detection executed in the embodiment;

DESCRIPTION OF THE PREFERRED EMBODIMENT

Hereinafter a preferred embodiment of the video signal processing apparatus of the present invention will be described in detail with reference to the accompanying drawings. This embodiment represents an exemplary case of applying the present invention to an image processing system which processes an input video signal of a still image transmitted thereto by phototelegraphy and produces an output video signal to be printed as a photograph, for example, in a newspaper.

Figure 10:
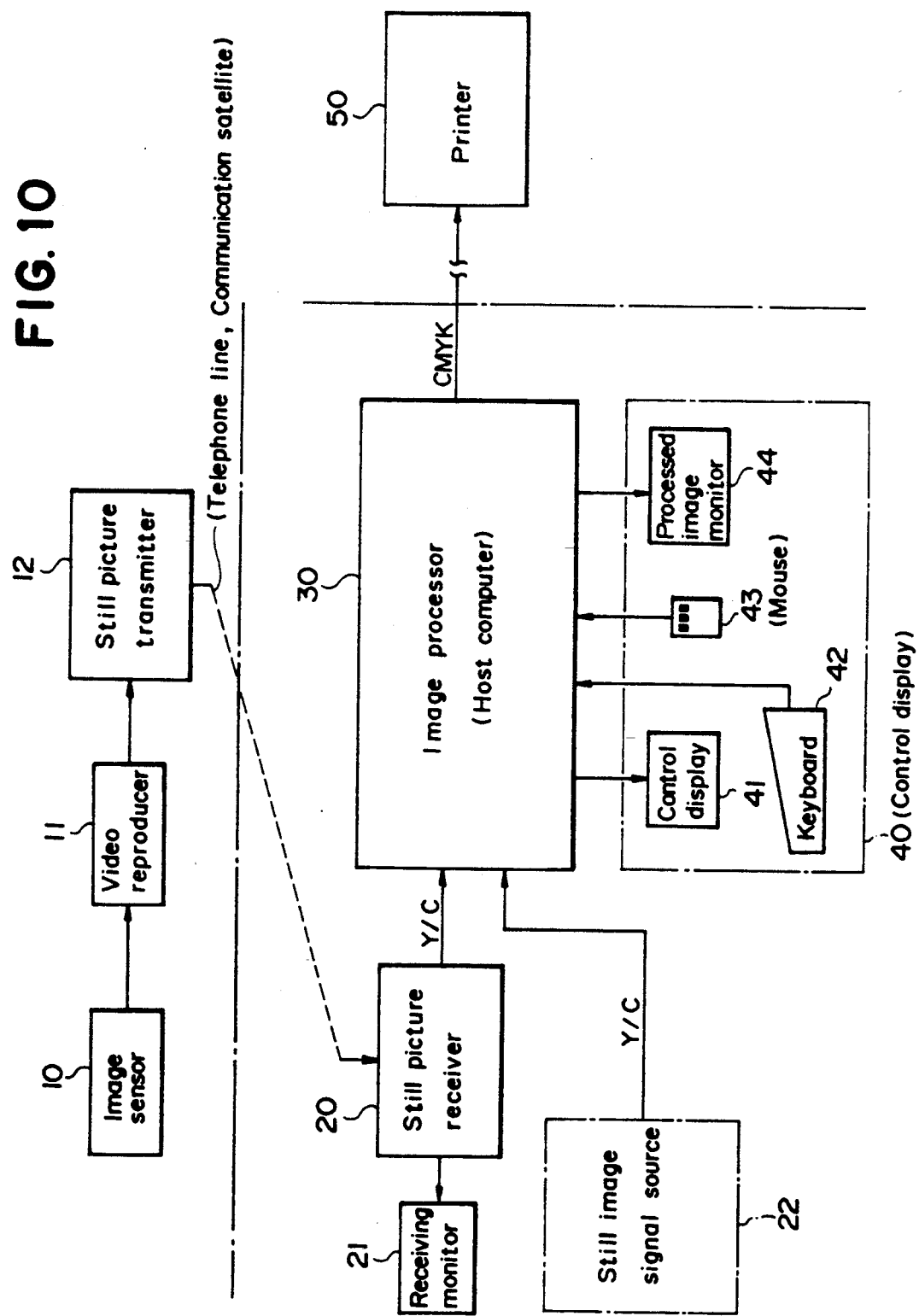
FIG. 10 is a block diagram showing the entire constitution of a video signal processing system where the embodiment of the present invention is employed.

FIG. 10 shows the entire constitution such as such image processing system, wherein there are included an image sensor 10 such as a video camera, a video reproducer (television monitor) 11 for reproducing the video image picked up by the image sensor 10, and a still picture transmitter 12 for transmitting a desired picture (color video signal of one image) out of the entire picked-up video images via a telephone line or a communication satellite.

Also shown are a still picture receiver 20 for receiving the picture outputted from the still picture transmitter 12, and a receiving monitor 21 for displaying the received picture. The still video image signal received by such still picture receiver 20 is composed of a luminance signal Y and color difference signals C (R-Y and B-Y signals) of one frame, and is supplied to an image processor 30 either automatically or manually. Denoted by 22 is a still image signal source such as a video disk unit, a video tape recorder, a television receiver or the like, and the video signal therefrom can also be supplied to the image processor 30. As will be described in detail later, the image processor 30 functions as a host computer in the entire system and is so constituted as to perform various operations for the video signal supplied thereto, such as storing the video signal, processing the image, and outputting the same as a print image signal.

Denoted by 40 is a console comprising a control display 41, a keyboard 42, a mouse 43 and a processed image monitor 44. This console 40 is manipulated by an operator to control various operations of the image processor 30. Reference numeral 50 denotes a printer which is supplied with the print image data processed by the image processor 30 and converted to print color signals of, e.g., C, M, Y and K (cyan, magenta, yellow and black) and then prints the desired image.

In the constitution of the system shown in FIG. 10, the video signal of the image obtained by picking up a news scene for example is supplied via the still picture transmitter 12 and the still picture receiver 20 to the image processor 30, and then the image data to be printed is supplied from the image processor 30 to the printer 50, whereby the above is effectively utilizable for an editing system or the like in, for example, a newspaper publishing company.

Figure 11:
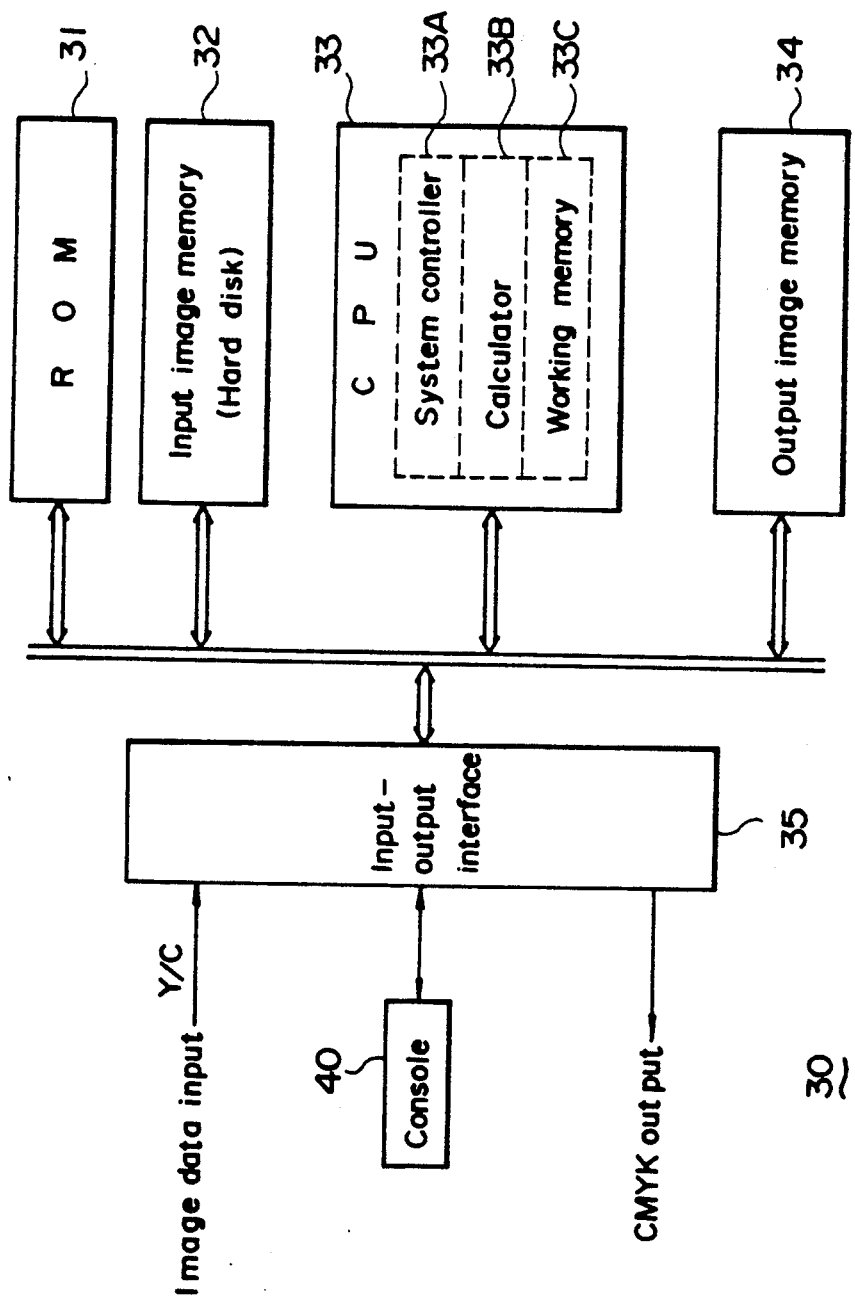
FIG. 11 is a block diagram of the video signal processing apparatus in the system of FIG. 10.

The image processor 30 in this embodiment comprises, as shown in FIG. 11, a ROM 31 where various control programs are stored, an input image memory 32 of a hard disk or the like where the image data inputted from an image source such as the still picture receiver 20 are sequentially stored; a central processing unit (CPU) 33; an output image memory 34 for storing output image data converted to individual color signals C, M, Y and K (cyan, magenta, yellow and black); and an input-output interface 35 for transferring the image data to or from the console 40. The CPU 33 consists of a system controller 33A for controlling the operations of the component elements in accordance with an operation program, a calculator 33a for executing various calculations, and a working memory (main storage memory) 33C.

Figure 12:
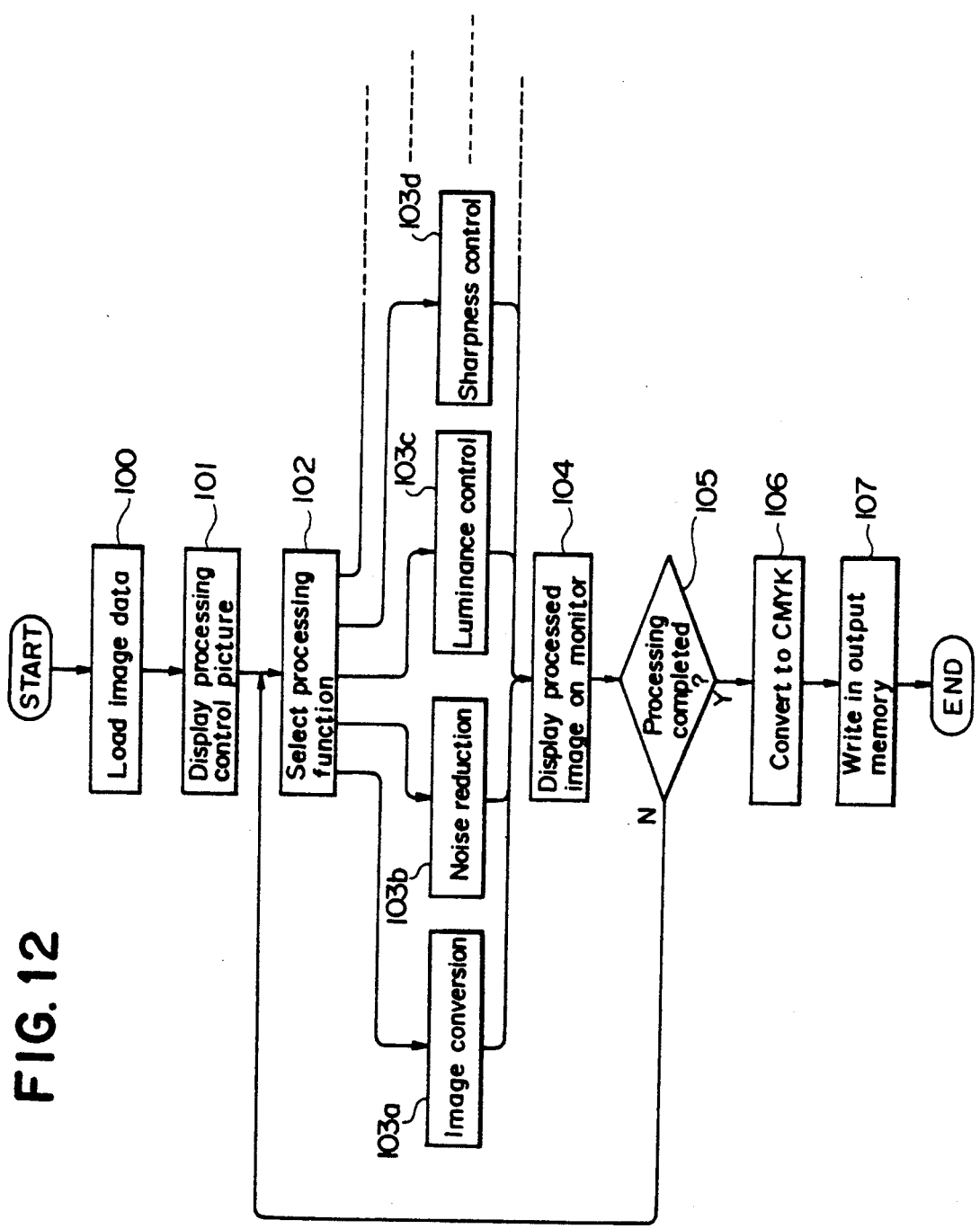
FIG. 12 is a flow chart showing a processing routine in the apparatus of FIG. 11.

The video signal supplied to such image processor 30 is automatically stored in the input image memory 32 simultaneously with the input. Then the image data is read out from the input image memory 32 by the CPU 33 as required, and the image processing routine as shown in a flow chart of FIG. 12 is executed in accordance with steps 100 through 107. In the image processing routine of FIG. 12 executed by the CPU 33, first the image data to be processed is loaded from the input image memory 32 into the working memory 33C in step 100, and then the control picture representing the content to be processed is displayed in the form of, for example, a menu on the control display 41 of the console 40 in step 101. Subsequently the process to be executed is selected by the operator and is input via the keyboard 42 or the mouse 43, so that the process function is determined in step 102. And the selected process is executed as image conversion in step 103$a$, noise reduction in step 103$b$, luminance control in step 103$c$, or sharpness control in step 103$d$. As for the image conversion in step 103$a$, any of enlargement, reduction, center position change, rotation, size change and so forth can be executed with respect to the input original image. Although the steps 103$a$, 103$b$, 103$c$, ... are shown in parallel in the flow chart of FIG. 12, it is a matter of course that such steps may be executed serially in a predetermined sequence.

Therefore the image thus processed is displayed on the monitor 44 in step 104 so that the operator can confirm the processed image. When a further process is to be executed, the operator manipulates the console 40 in step 105 to thereby return the operation of the CPU 33 to step 102.

In the stage following completion of the entire necessary image processing operations, the video signal composed of luminance signal Y and color difference signal C is converted to image data of four colors C-M-Y-K adapted to be printed (step 106), and then such converted signal is stored as output data in the output image memory 34 (step 107). Subsequently, the image data thus stored is supplied to the printer 50 either automatically or by manipulation of the console 40, whereby one picture is printed with the image data of four colors C-M-Y-K.

The noise reduction executed in step 103$b$ will now be described in detail below. The noise reduction in this embodiment is defined as elimination of the video signal noise which causes color nonuniformity or the like conspicuous in any relatively wide image region where the color variations are minimal.

Figure 1:
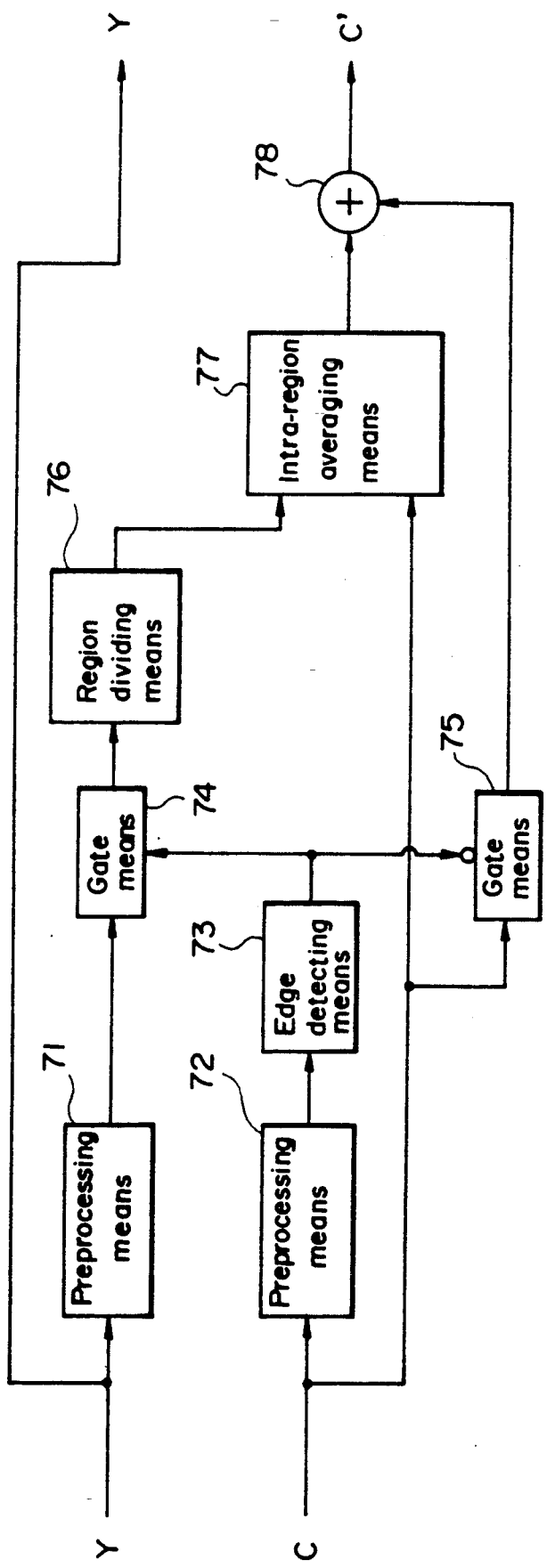
FIG. 1 is a functional block diagram of a video signal processing apparatus embodying the present invention for noise reduction.

FIG. 1 is a functional block diagram of the image processor 30 for performing noise reduction. In this diagram are included a preprocessing means 71 for the input luminance signal Y, and a preprocessing means 72 for the input color difference signals C (R-Y, B-Y). Such preprocessing means 71 and 72 function to execute uniform smoothing operations previously for the luminance signal Y and the color difference signals C respectively so as to render the subsequent processes effective.

Figure 2:
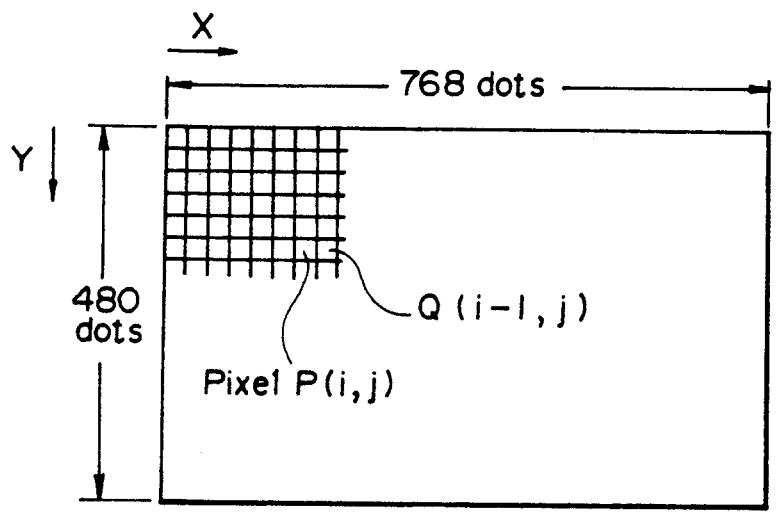
FIG. 2 is a schematic diagram illustrating how a picture is divided into pixels in an exemplary embodiment.

In this embodiment, an image of one frame (corresponding to one picture) is divided into pixels composed of 768 horizontal dots (in the X-direction) and 480 vertical dots (in the Y-direction) as shown in FIG. 2, and the coordinates of any pixel in one picture are represented by (i, j) (where $0 \leq i \leq 767$, $0 \leq j \leq 479$). Accordingly, the coordinates of two pixels P and Q mutually adjacent in the horizontal direction for example can be represented by (i, j) and (i+1, j) respectively. And there are allocated, to each of the pixels, an 8-bit luminance signal Y and two 8-bit color difference signals R-Y and B-Y.

Figure 3A:
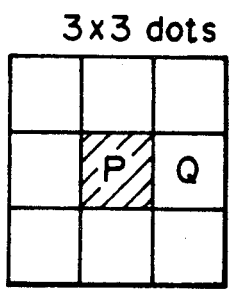
FIGS. 3a, 3b and 4 schematically show compositions of a block for averaging a luminance signal Y and a color difference signal C, respectively.
Figure 3B:
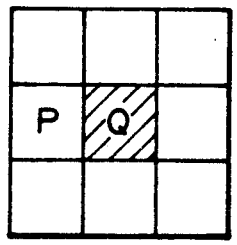

In the preprocessing means 71, a block of 3×3 dots around the subject pixel P to be processed is extracted as shown in FIG. 3A, and the average value of 9 luminance signals Y in such block is regarded as the value of the luminance signal Y in the subject pixel P. Similarly, relative to the next pixel Q adjacent to the former subject pixel P, as shown in FIG. 3B, the average value of the luminance signals Y in a block of 3×3 dots around the pixel Q is regarded as the value of the luminance signal Y in the pixel Q, whereby all pixels in one picture are thus smoothed.

Figure 4:
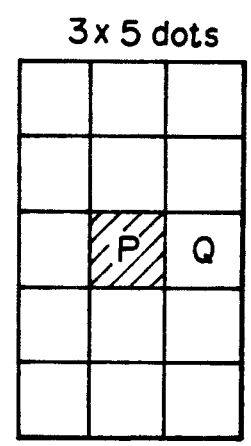

Meanwhile in the preprocessing means 72, a block of 3 (X-direction) dots×5 (Y-direction) dots around the subject pixel P to be processed is extracted as shown in FIG. 4, then the average values of the color difference signals R-Y and B-Y of the 15 pixels in such extracted block are calculated individually, and the average values thus obtained are regarded as the respective values of the two color difference signals R-Y and B-Y of the pixel P. Although uniform smoothing alone is performed as a preprocessing operation in this embodiment, it is also effective to execute histogram conversion or Laplacian for achieving satisfactory sharpness. In the smoothing, a further advantage may be attained by execution of arbitrary weighting in addition to the uniform weighting, or by adoption of some adequate block size other than the aforementioned 3×3 or 3×5 dots, or by repetition of the process plural times. The smoothed color difference signals C obtained by the preprocessing means 72 are supplied to an edge detecting means 73.

The edge detecting means 73 detects, with regard to the color difference signals C, edge portions in one picture where color variations are conspicuous. In this embodiment, there is employed an extended sobel operator, which is one of differential mask operators, for detecting the edge portions of the color difference signals C. The extended sobel operator is an improvement of a sobel operator contrived for an image of low signal-to-noise ratio. Here a description will first be given on such sobel operator. Assume now that the values of color difference signals R-Y and B-Y at the coordinates (k, l) are f1 (k, l) and f2 (k, l) respectively, and the position of the subject pixel P to be processed is represented by coordinates (i, j). Then, with regard to the color difference signal R-Y detected by using the sobel operator, the edge signal $f1_x(i, j)$ in the X-direction and the edge signal $f1_y(i, j)$ in the Y-direction relative to the pixel P are expressed by the following equations.

$$f1_x(i, j) = f1(i+1, j-1) + 2f1(i+1, j) + f1(i+1, j+1) - f1(i-1, j-1) - 2f1(i-1, j) - f1(i-1, j+1) \quad (1)$$

$$f1_y(i, j) = f1(i-j, j+1) + 2f1(i, j+1) + f1(i+1, j+1) - f1(i-1, j-1) - 2f1(i, j-1) - f1(i+1, j-1) \quad (2)$$

Similarly, with regard to the color difference signal B-Y also, the edge signal $f2_x(i, j)$ in the X-direction and the edge signal $f2_y(i, j)$ in the Y-direction relative to the pixel P are represented by f2(k, l). More specifically, a block of 3×3 dots around the subject pixel P to be processed is extracted according to the sobel operator, and each of the 9 pixels in such block is weighted with a coefficient (0, ±1 or ±2) as shown in FIGS. 5A and 5B relative to the X-direction and the Y-direction respectively. And with regard to the color difference signals R-Y and B-Y of the pixel P, the edge signals f1(i, j) and f2(i, j) are so defined as expressed by the following equations respectively.

$$f1(i, j) = \sqrt{f1_x(i, j)^2 + f1_y(i, j)^2} \quad (3)$$

$$f2(i, j) = \sqrt{f2_x(i, j)^2 + f2_y(i, j)^2} \quad (4)$$

Further in this embodiment, the square sum of such edge signals f1(i, j) and f2(i, j) is calculated, and any pixel having a square sum greater than a predetermined threshold value is regarded as an edge portion.

Figure 6A:
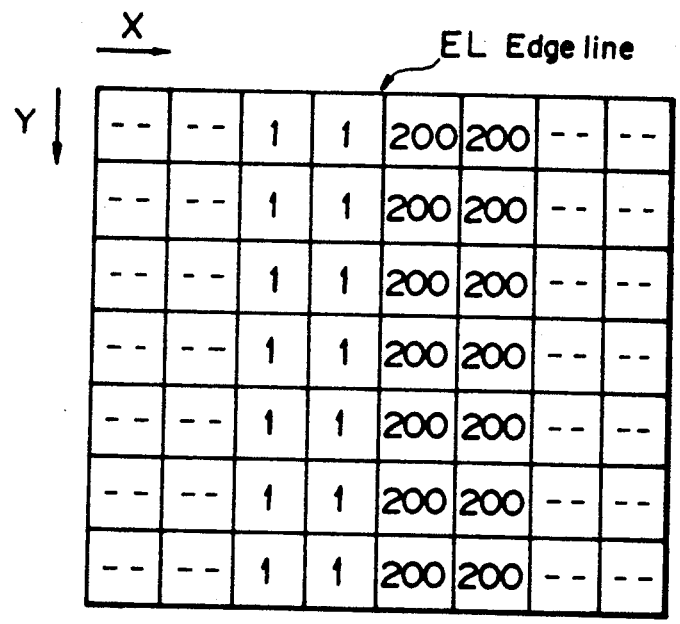
Figure 6B:
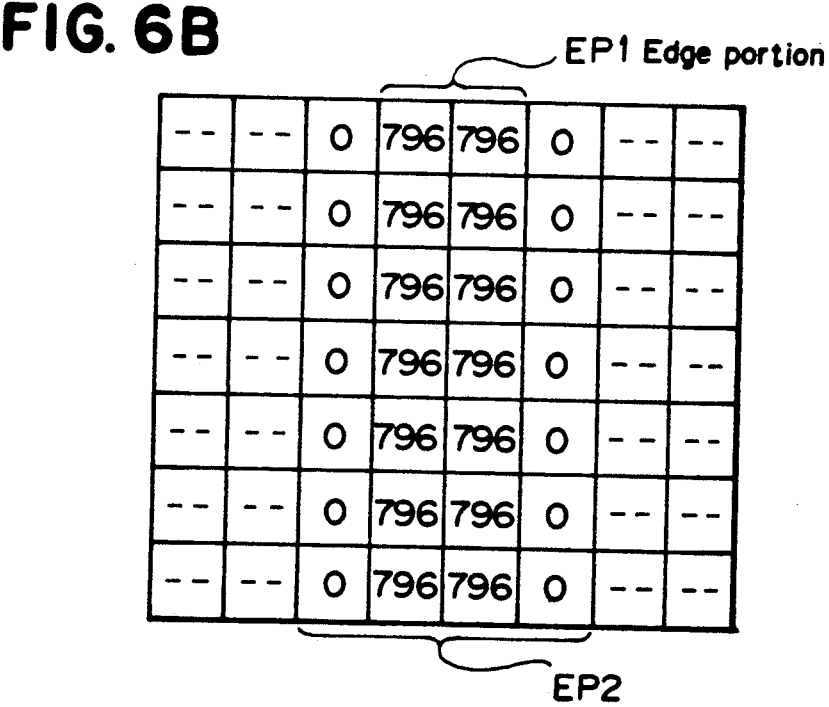

Assume now that, in an image where an edge portion is to be detected, the color difference signal R-Y of each pixel on the left side of one Y-direction edge line EL has a value 1 as shown in FIG. 6A, while the color difference signal R-Y of each pixel on the right side has a value 200. In such a case, it is found from Eq. (1) that the value of $f1_x(i, j)$ becomes 796 in two rows of the pixels on both sides of the edge line EL, while the value in any other pixel becomes 0. Also from Eq. (2), the value of $f2_y(i, j)$ becomes 0 in any pixel. Therefore the value of the edge signal f1(i, j) defined by Eq. (3) becomes 796 merely in a portion EP1 composed of two-row pixels on both sides of the edge line EL in FIG. 6A, while the value becomes 0 in any other region as shown in FIG. 6B. In this case, on an assumption that the entire pixels have the same value with respect to the color difference signal R-Y, the value of the edge signal f2(i, j) becomes 0 in each of the pixels, and therefore the square sum of the edge signals f1(i, j) and f2(i, j) comes to exceed the predetermined threshold value in the portion EP1 shown in FIG. 6B, so that the portion EP1 is regarded as an edge portion.

As will be obvious from a comparison between FIG. 6A and FIG. 6B, when an edge portion is detected by using the sobel operator, any region having a predetermined width inclusive of the edge line EL is prone to be detected as an edge portion.

In this embodiment, practically an extended sobel operator is used instead of such sobel operator. In using the extended sobel operator, an X-direction edge signal relative to the subject pixel P to be processed for the color difference signal R-Y is obtained by first extracting a block of 5 (X-direction) dots×3 (Y-direction)dots around the pixel P as shown in FIG. 7A, and then adding a weighting coefficient (0, ±1 or ±2) to each of the 15 pixels individually. Meanwhile, a Y-direction edge signal is obtained by first extracting a block of 3×5 dots around the subject pixel as shown in FIG. 7B and then adding a weighting coefficient (0, ±1 or ±2) to each of the 15 pixels individually. And the edge signal with respect to the color difference signal R-Y is calculated from the square root of the square sum of the X-direction edge signal and the Y-direction edge signal. The edge signal with respect to the color difference signal B-Y is obtained in a similar manner.

Since such extended sobel operator increases the number of pixels in the block to be computed, the detected edge portion tends to be wider. More specifically, when the extended sobel operator is used for the image of FIG. 6A, the detected edge is a portion EP2 composed of four-row pixels on both sides of the edge line EL in FIG. 6A. Further according to the extended sobel operator, it is possible to ensure proper detection of any edge portion even in an input image of low signal-to-noise ratio.

The edge detecting means 73 in this embodiment supplies to both gate means 74 and 75 the coordinates of the pixels in the edge portion detected by the above method, and also supplies thereto the smoothed luminance signal Y and the input color difference signals C.

The gate means 74 supplies to a region dividing means 76 the luminance signal in the entire image regions except the edge portion detected by the detecting means 73. Meanwhile the other gate means 75 supplies to an adding means 78 the color difference signals C while passing the same through the edge portion and further supplies to the adding means 78 the zero-level signal in any region other than the edge portion.

Figure 8:
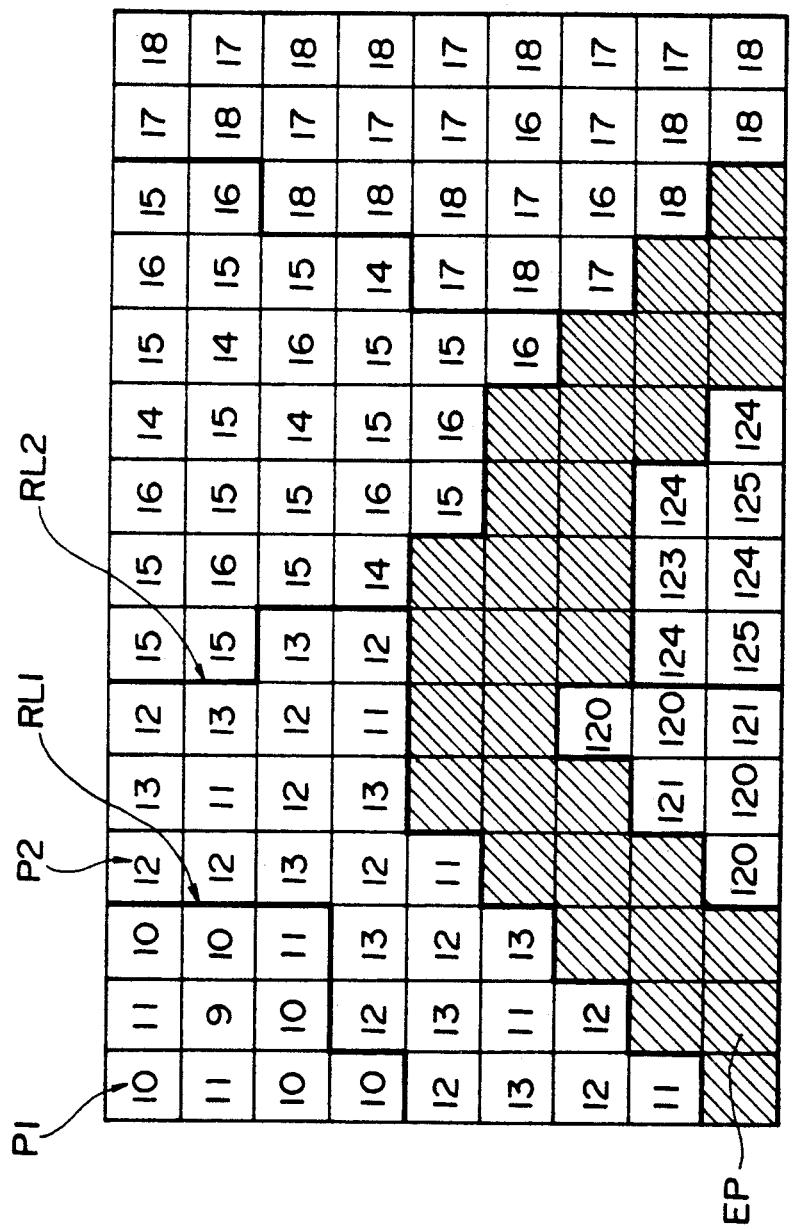
FIG. 8 is a schematic diagram showing exemplary division into regions in the embodiment.

Since the edge detection by the edge detecting means 73 is performed on the basis of variations in the color difference signals, there may occur an occasion where an original edge portion fails to be detected as an edge. In such portion, however, it is usually probable that the variations in the luminance signal Y are distinct in most cases. Therefore the region dividing means 76 divides the picture area, except the edge portion detected by the edge detecting means 73, into one or more regions in accordance with the levels of the luminance signal Y. For executing such division, this embodiment adopts a method of repetitive region consolidation. The region division carried out by such repetitive region consolidation will now be described below specifically with reference to an exemplary case where the picture to be divided is composed of pixels of 15×9 dots as shown in FIG. 8 and the shaded area EP corresponds to an edge portion. In this example, numerical values affixed to the individual pixels except the edge portion in FIG. 8 denote the levels of the luminance signal Y.

In the two-dimensional image processing, a state where any pixel is adjacent to others at four sides thereof is termed "4-adjacency", and a state where any pixel is adjacent to others at four sides and four apexes thereof is termed "8-adjacency". In the following example, the adjacency state of pixels signifies 4-adjacency. In this case, there is first calculated a consolidated region of pixels where, with reference to a pixel P1 (level=10) at the left upper end in FIG. 8, the level difference between the luminance signals Y of two mutually adjacent pixels is 0 or ±1. Then the consolidated region is such as partitioned by a region line RL1. Subsequently, there is calculated a consolidated region of pixels where, with reference to the uppermost pixel P2 (level=12) out of the entire pixels adjacent to the region line RL1, the level difference between the luminance signals Y of the two mutually adjacent pixels is 0 or ±1. Then the consolidated region is such as surrounded with region lines RL1, RL2 and a contour line of an edge portion EP. Similarly, if the picture is divided in accordance with the levels of the luminance signal Y, each region line becomes a thick solid line as shown in FIG. 8.

Figure 9:
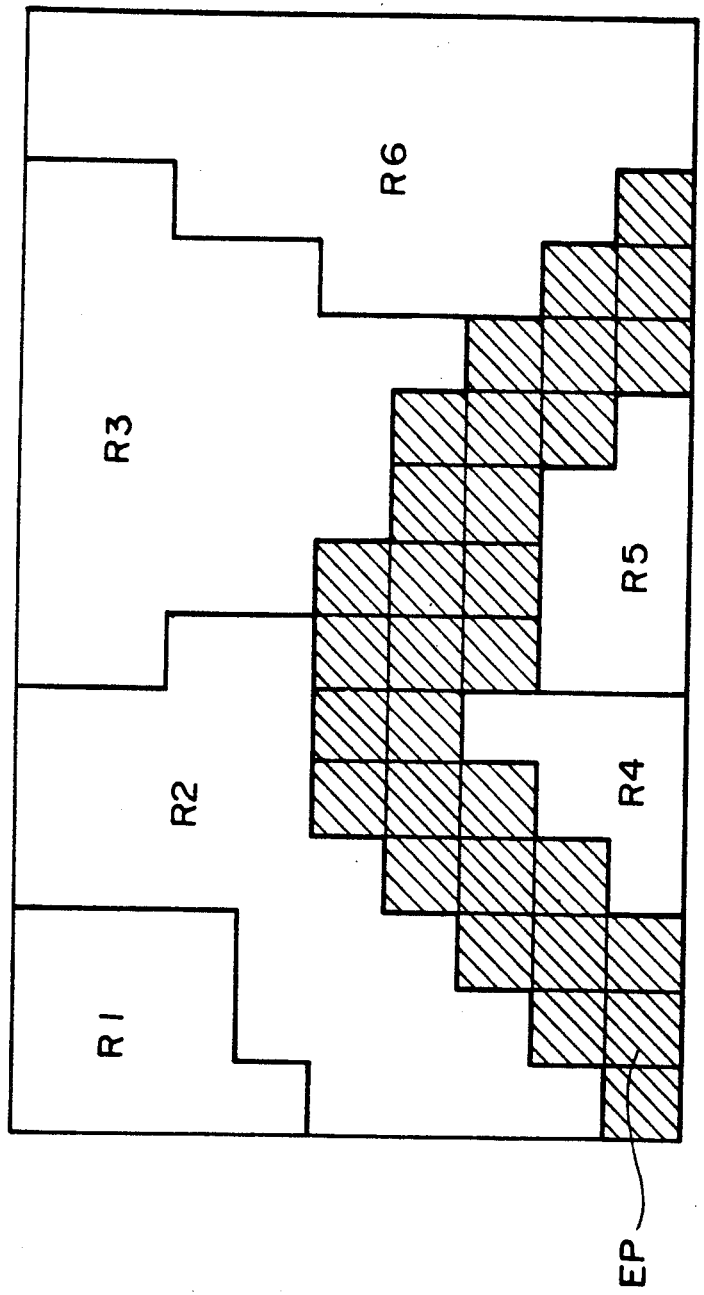
FIG. 9 is a schematic diagram showing exemplary intra-region averaging executed in the embodiment.

Consequently, in this example, regions R1, R2, ..., R6 surrounded with such region lines and the contour line of the edge portion EP are so divided as shown in FIG. 9. As shown in FIG. 1, region dividing means 76 supplies to an intra-region averaging means 77 the information of the regions divided by the above-described procedure, and also supplies the input color difference signals C directly to the intra-region averaging means 77.

In the intra-region averaging means 77, average values are calculated with regard to the color difference signals R-Y and B-Y in the individual regions divided by the region dividing means 76, and a pair of such values are regarded as renewed values of the color difference signals R-Y and B-Y in the individual regions. Simultaneously the values of the color difference signals C in the edge portion EP are changed to 0, and the renewed values of the color difference signals C are supplied to the adding means 78. Therefore, the adding means 78 produces a sum signal C' which represents the sum of the color difference signals obtained from the intra-region averaging means 77 and the color difference signals obtained from the gate means 75. And such sum signal C' is used as the color difference signal output in this embodiment.

Accordingly, the value of the color difference signal C' outputted from the adding means 78 in the example of FIG. 9 becomes exactly equal to the value of the input color difference signal C in each pixel of the edge portion EP detected by the edge detecting means 73. Meanwhile in the regions R1 through R6 except the edge portion EP, the output becomes the averaged color difference signal obtained in the intra-region averaging means 77. In this example, the output luminance signal is exactly the same as the input luminance signal Y.

In this embodiment, as described above, the edge detecting means 73 detects an edge portion where the color difference signals have great variations, and the color difference signals C input to such edge portion are directly output. Meanwhile in any other area than the edge portion, the picture is divided into smaller regions in accordance with the levels of the luminance signal Y, and the color difference signals C input to such divided regions are averaged before being output. Since the color difference signals C are thus averaged in any area except the edge portion, i.e., in any area where color variations are minimal, it becomes possible to eliminate the video signal noise which causes conspicuous color nonuniformity and so forth in the portion with minimal color variations.

As the noise in the still image video signal can be eliminated in this embodiment, the image quality of the color still picture to be printed is improved with another advantage that such video signal is rendered applicable also to some other purpose than printing. Furthermore, due to an increase of the processing speed, it is apparent that the noise reduction performed in this embodiment is utilizable for a motion picture as well as for a still picture, hence achieving enhancement in the image quality of the motion picture signal.

It is to be understood that the present invention is not limited to the above embodiment alone and may be modified to any of various adequate constitutions within the scope not departing from the inventive concept thereof.

Thus, according to the present invention, remarkable advantages are attainable in eliminating the video signal noise which causes conspicuous color nonuniformity and so forth in any image portion where color variations are minimal.

What is claimed is:

1. A video signal processing apparatus for processing a color video signal representing an image received from a video signal source and converting the color video signal to a signal to be printed by a printer, said apparatus comprising:

edge detecting means for detecting an edge portion of the image from a chrominance signal of the input color video signal and producing an edge signal;

first gate means receiving the edge signal and a luminance signal of the input color video signal for removing the edge portion from the luminance signal of the input color video signal in accordance with said edge signal;

second gate means receiving the chrominance signal and said edge signal for producing a signal representing only the edge portion from the chrominance signal of the input color video signal;

region dividing means connected to said first gate means for dividing the luminance signal output from said first gate means into regions based on approximate values of the luminance signal and generating a region division signal;

region averaging means receiving the chrominance signal and the region division signal for averaging the chrominance signal in each of the regions in accordance with the region division signal from said region dividing means and producing an averaged chrominance signal; and adding means for outputting a processed chrominance signal by adding the edge portion of the chrominance signal from said second gate means and the averaged chrominance signal from said region averaging means.

2. A video signal processing apparatus according to claim 1, wherein said edge detecting means uses an extended sobel operator for detection of an edge portion by first extracting blocks of the input chrominance signal each composed of a predetermined number of pixels around a subject pixel to be processed, thereafter giving weighting coefficients to the pixels of each block respectively, then calculating the square sum in each block and, upon detection of any square sum in excess of a predetermined threshold value, regarding said subject pixel as an edge.

3. A video signal processing apparatus according to claim 1, wherein said region dividing means employs a process of repetitive region consolidation which compares the luminance signal level of a reference pixel with that of one of the pixels adjacent to said reference pixel, then consolidates such pixels into the same region if the level difference therebetween is within a predetermined range, and subsequently analyzes the next adjacent pixel in a similar manner.

4. A video signal processing apparatus according to claim 2, wherein said input chrominance signal is a color difference signal.

5. A video signal processing apparatus according to claim 2, wherein the color video signal obtained from said video signal source represents a still image.

6. A video signal processing apparatus according to claim 1, further comprising:

luminance signal preprocessing means for performing a luminance signal smoothing process by determining the luminance signal level of a center pixel from the average of the luminance signal levels of adjacent pixels and producing the luminance signal received by said first gate means; and a chrominance signal preprocessing means for performing a chrominance signal averaging processing by determining the chrominance signal level of the center pixel from the average of the chrominance signal levels of the adjacent pixels and producing the chrominance signal received by said second gate means.

7. A video signal processing apparatus according to claim 6, wherein said luminance signal preprocessing means determines the luminance signal level of the center pixel from the value obtained by calculating the luminance levels of 8 pixel adjacent to the center pixel; and said chrominance signal preprocessing means determines the chrominance signal level of the center pixel from the value obtained by calculating the chrominance signal levels of 14 pixels around the center pixel.

* * * * *